United States Patent
Katsuro et al.

(10) Patent No.: US 6,235,364 B1
(45) Date of Patent: May 22, 2001

(54) PRESSURE-SENSITIVE CORRECTION TAPE

(75) Inventors: Noboru Katsuro; Masayuki Imanishi; Kazuo Miyai, all of Osaka (JP)

(73) Assignee: Fujicopian Co., Ltd., Osaka (JP)

( * ) Notice: Subject to any disclaimer, the term of this patent is extended or adjusted under 35 U.S.C. 154(b) by 0 days.

(21) Appl. No.: 09/191,274

(22) Filed: Nov. 12, 1998

(30) Foreign Application Priority Data

Nov. 13, 1997 (JP) .................................................. 9-312300

(51) Int. Cl.$^7$ ....................................................... C09J 7/02
(52) U.S. Cl. ..................... 428/40.1; 400/697.1; 428/202; 428/354; 428/425.1; 428/914
(58) Field of Search .................................. 428/40.1, 354, 428/202, 425.1, 914; 400/697.1

(56) References Cited

U.S. PATENT DOCUMENTS

| 3,847,725 | 11/1974 | Hochner | 161/167 |
|---|---|---|---|
| 4,289,666 * | 9/1981 | Creekmore | 428/914 |
| 4,746,388 * | 5/1988 | Inaba | 400/696 |
| 4,883,379 | 11/1989 | Fukuda | 400/697.1 |
| 4,891,260 | 1/1990 | Kunkel | 428/220 |
| 5,135,798 | 8/1992 | Muschter | 428/202 |
| 5,221,577 | 6/1993 | Inaba | 428/354 |
| 5,700,552 | 12/1997 | Katsuro | 428/214 |

* cited by examiner

Primary Examiner—Nasser Ahmad
(74) Attorney, Agent, or Firm—Fish & Neave

(57) ABSTRACT

A pressure-sensitive correction tape is provided which comprises a foundation, a masking layer and a pressure-sensitive adhesive layer stacked on the foundation in this order, the masking layer comprising a masking agent, a polymer having rubber elasticity and an ester compound which is liquid at ordinary temperature and has a boiling point of not less than 130° C. at ordinary pressure.

4 Claims, No Drawings

PRESSURE-SENSITIVE CORRECTION TAPE

BACKGROUND OF THE INVENTION

The present invention relates to a pressure-sensitive correction tape comprising a tape-like foundation having a masking layer thereon. More particularly, it relates to a pressure-sensitive correction tape having performance wherein the masking layer thereof, once transferred on a receptor, can be readily removed with an eraser as required.

Heretofore, there has been known a method of using a multi-layer pressure-sensitive correction tape for masking erroneously typewritten letters or the like. A conventional pressure-sensitive correction tape of this type has a structure comprising a tape-like foundation having thereon a masking layer and a pressure-sensitive adhesive layer stacked in this order.

In conducting a masking operation using a pressure-sensitive correction tape, the masking layer is ocassionally erroneously transferred on a portion of a receptor which should not be masked. In this situation, it is necessary to remove the masking layer transferred on this portion. However, using the conventional pressure-sensitive correction tape, it is difficult to easily remove the transferred mashing layer from the receptor.

An object of the present invention is to provide a pressure-sensitive correction tape having high performance wherein the masking layer thereof, after being transferred onto a receptor, can be readily removed from the receptor.

The foregoing and other objects of the present invention will be apparent from the following detailed description.

SUMMARY OF THE INVENTION

In accordance with a first feature of the present invention, there is provided a pressure-sensitive correction tape comprising a foundation, a masking layer and a pressure-sensitive adhesive layer stacked on the foundation in this order, the masking layer comprising a masking agent, a polymer having rubber elasticity and an ester compound which is liquid at ordinary temperature and has a boiling point of not less than 130° C. at ordinary pressure.

In accordance with a second feature of the present invention, the pressure-sensitive correction tape with the first feature is further characterized in that the polymer having rubber elasticity comprises a styrene polymer and the ester compound being liquid at ordinary temperature comprises at least one member selected from the group consisting of di(2-ethylhexyl) adipate, di(2-ethylhexyl) sebacate, di(2-ethylhexyl) azelate, fatty acid triglyceride, trimethylolpropane trioctanoate, butyl benzyl phthalate, diisodecyl phthalate, trioctyl phosphate, tributyl phosphate, tri(butoxyethyl) phosphate, acetyl tributyl citrate and acetyl triethyl citrate.

In accordance with a third feature of the present invention, the pressure-sensitive correction tape with the first or second feature is further characterized in that a coating agent for the pressure-sensitive adhesive layer shows an adhesive strength of 10 to 70 g/25 mm according to the 180° peel method specified in JIS Z 0237.

The adhesive strength of the coating agent for the pressure-sensitive adhesive layer is a value determined according to the 180° peel method specified in JIS Z 0237-1991. A test specimen is prepared by the following method: A coating agent to be used for forming the pressure-sensitive adhesive layer is applied onto a 25 $\mu$m-thick polyethylene terephthalate film and dried to give a 1.2 $\mu$m-thick pressure-sensitive adhesive layer. A 25 mm-wide, 300 mm-long tape is cut off therefrom and used as a test specimen.

In the pressure-sensitive correction tape of the present invention, the masking layer comprises a masking agent, a polymer having rubber elasticity and an ester compound which is liquid at ordinary temperature and has a boiling point of not less than 130° C. at ordinary pressure.

By virtue of such a constitution of the masking layer, the polymer having rubber elasticity as a binder is modified by the plasticizing action of the ester compound being liquid at ordinary temperature and having a boiling point of not less than 130° C. at ordinary pressure, so that the polymer becomes soft and brittle and is endowed with tackiness. The masking layer thus lowered in its strength and endowed with tackiness is excellent in affinity with an eraser or the like, hence, is readily sticks thereto. As a result, the masking layer transferred onto a receptor can be readily broken by simple rubbing with an eraser or the like and readily removed.

In a preferred embodiment of the present invention, the polymer having rubber elasticity as a binder is a styrene polymer and the ester compound being liquid at ordinary temperature is at least one member selected from the group consisting of di(2-ethylhexyl) adipate, di(2-ethylhexyl) sebacate, di(2-ethylhexyl) azelate, fatty acid triglyceride, trimethylolpropane trioctanoate, butyl benzyl phthalate, diisodecyl phthalate, trioctyl phosphate, tributyl phosphate, tri(butoxyethyl) phosphate, acetyl tributyl citrate and acetyl triethyl citrate. In this embodiment, the binder is more effectively plasticized, thereby further facilitating the removal of the transferred masking layer.

In another preferred embodiment of the present invention, the adhesive strength according to the 180° peel method specified in JIS Z 0237 (hereinafter simply referred to as "adhesive strength") of the coating agent for the pressure-sensitive adhesive layer is specified to a range of 10 to 70 g/25 mm. In this embodiment, the removal of the transferred masking layer is further facilitated without degrading the transferability of the masking layer.

The present invention will be more specifically explained.

Useful as the foundation are plastic films such as polyethylene terephthalate, polyethylene and polypropylene, and paper sheets such as glassine paper. The plastic films preferably have a thickness of about 10 $\mu$m to about 50 $\mu$m and the paper sheets preferably have a basis weight of about 30 to about 50 g/m$^2$. As required, a releasing agent is applied on one or both sides of the foundation to reduce the adhesion of the adhesive layer to the back side of the foundation during the storage of the pressure-sensitive correction tape wound in the form of a roll or to facilitate the release of the masking layer from the foundation in transferring. Examples of the releasing agents include silicone resins and fluorine-containing resins. Also usable as the foundation are commercially available foundations previously coated with a releasing agent.

The masking layer in the present invention is composed of a masking agent, a polymer having rubber elasticity and an ester compound which is liquid at ordinary temperature and has a boiling point of not less than 130° C. at ordinary pressure.

Examples of specific polymers having rubber elasticity are styrene polymers, polyurethane rubbers, fluorine-containing rubbers, acrylonitrile-butadiene rubbers, ethylene-vinyl acetate copolymers, ethylene-alkyl acrylate copolymers, chlorosulfonated polyethylene and cyclized rubbers. These polymers may be used either alone or in combination of two or more species thereof in consideration of the transferability or the like of the masking layer.

The preferred polymers having rubber elasticity are styrene polymers for the ease of use with the ester compound which is liquid at ordinary temperature and has a boiling point of not less than 130° C. at ordinary pressure. Examples of the styrene polymers are styrene-butadiene-styrene block copolymer (SBS), styrene-ethylene-butylene-styrene block copolymer (SEBS), styrene-butadiene rubber, styrene-isoprene-styrene block copolymer (SIS), and styrene-ethylene/propylene block copolymer (SEP). These may be used either alone or in combination of two or more species thereof.

A resin may be used in combination with the polymer having rubber elasticity as a binder for the masking layer. By the combined use of the resin with the polymer, it is possible to improve the cut-off performance of the masking layer and to adjust the hardness of the masking layer. Examples of specific resins include hydrocarbon resins, styrene-acryl copolymer, ketone resins, vinyl chloride-vinyl acetate copolymer, and polyolefin resins such as polyethylene and polypropylene. These resins may be used either alone or in combination of two or more species thereof.

The especially preferred ester compounds which are liquid at ordinary temperature and have a boiling point of not less than 130° C. at ordinary pressure are, for instance, di(2-ethylhexyl) adipate(335° C. in terms of boiling point at ordinary pressure, hereinafter the same unless otherwise noted), di(2-ethylhexyl) sebacate(377° C.), di(2-ethylhexyl) azelate(237° C./5 mmHg), fatty acid triglyceride(more than 130° C.), trimethylolpropane trioctanoate(more than 250° C.), butyl benzyl phthalate(370° C.), diisodecyl phthalate (420° C.), trioctyl phosphate(220° to 250° C./5 mmHg), tributyl phosphate(289° C.), tri(butoxyethyl) phosphate (222° C./4 mmHg), acetyl tributyl citrate(173° C./1 mmHg) and acetyl triethyl citrate(132° C./1 mmHg) since they exhibit good plasticizing action to the aforesaid polymers having rubber elasticity, especially the styrene polymers.

Examples of the fatty acid triglycerides include refined castor oil, peanut oil and refined rapeseed oil.

The masking layer is usually colored white with a white masking agent because articles to be subjected to masking-correction using the pressure-sensitive correction tape of the present invention are generally white paper sheets. Where a paper sheet or a like article colored in a color other than white is to be subjected to masking-correction, it is preferable that the masking layer is colored in substantially the same color as the background color of the article so that masked portions thereof are not distinguished from the background nor are they outstanding. Typically used as the white masking agent is titanium oxide because of its excellent hiding power.

Examples of masking agents in colors other than white include inorganic pigments such as Titanium Yellow, iron oxide pigments, Ultramarine Blue, Cobalt Blue, Chromium Oxide Green, Spinel Green, Chrome Yellow, Chrome Vermilion, Cadmium Yellow and Cadmium Red, and organic pigments such as azo lake pigments, Hanza pigments, benzimidazolone pigments, monoazo pigments, diarylide pigments, pyrazolone pigments, condensed azo pigments, phthalocyanine pigments, quinacridone pigments, perylene pigments, perinone pigments, dioxazine pigments, anthraquinone pigments and isoindolinone pigments.

The contents of the masking agent and binder in the masking layer are preferably from about 55 to about 75% by weight and from about 20 to about 30% by weight, respectively.

The content of the ester compound which is liquid at ordinary temperature and has a boiling point of not less than 130° C. at ordinary pressure in the masking layer is preferably from 4 to 11% by weight, more preferably from 6 to 8% by weight. When the content of the ester compound is less than the above range, the effect of plasticizing the binder is prone to be insufficient so that the desired removability of the masking layer is not achieved. When the content of the ester compound is more than the above range, the strength of the masking layer is prone to be excessively small so that an overwriting performance (which means that when letters or the like are written on the transferred masking layer with a writing instrument such as a pencil or a ball-point pen, the writing is favorably conducted), one of common characteristics required for the pressure-sensitive correction tape of this type is lessened.

When the polymer having rubber elasticity is used in combination with the resin, the amount of the resin is preferably from 60 to 140 parts by weight, more preferably from 80 to 120 parts by weight with respect to 100parts by weight of the polymer. When the amount of the resin is less than the aforesaid range, the resulting masking layer is liable to be poor in cut-off performance. When the amount of the resin is more than the aforesaid range, the resulting masking layer is liable to be lowered in strength, resulting in the occurrence of cracks therein upon the transfer thereof and poor overwriting performance.

The masking layer can be incorporated with additives such as porosity-adjusting agent and dispersing agent in addition to the foregoing components.

For the formation of the masking layer, the masking agent, ester compound and, as required, other additives are added to a solution of the vehicle in an organic solvent or a dispersion (including emulsion) of the vehicle in an organic solvent or water to prepare a coating liquid. The coating liquid is applied on the foundation and then dried.

The thickness (thickness after being dried, hereinafter the same) of the masking layer is preferably from 22 to 28 $\mu$m. When the thickness is smaller than the aforesaid range, the hiding power of the resulting masking layer is insufficient. When the thickness is greater than the aforesaid range, the strength of the resulting masking layer is excessively increased so that the masking layer is not readily removed with an eraser or the like.

The pressure-sensitive adhesive layer in the present invention is preferably prepared from a coating agent showing an adhesive strength of 10 to 70 g/25 mm. When the adhesive strength of the adhesive layer is less than the aforesaid range, transfer failure is liable to occur. When the adhesive strength of the adhesive layer is greater than the aforesaid range, the removal of the masking layer from the receptor is difficult.

Adhesives to be used for the pressure-sensitive adhesive layer are preferably those having greater cohesive force. For this reason, acrylic resin type adhesives are usually used.

The adhesive layer can be incorporated with a leveling agent or the like besides the adhesive component, as required.

For the formation of the pressure-sensitive adhesive layer, a solution or dispersion of the adhesive in an organic solvent, or an aqueous solution or dispersion (including emulsion) of the adhesive is applied on the masking layer and then dried.

The thickness of the pressure-sensitive adhesive layer is preferably from 0.8 to 1.6 $\mu$m. When the thickness of the adhesive layer is smaller than the above range, the removability of the masking layer is prone to be rather degraded.

When the thickness of the adhesive layer is greater than the above range, the migration of the component of the adhesive layer to the back surface of the foundation is liable to occur when the correction tape is stored in a state where it is wound in the form of a roll.

As described above, in the present invention, it is preferable that the thickness of the masking layer is from 22 to 28 $\mu$m and the thickness of the adhesive layer is from 0.8 to 1.6 $\mu$m. That is, it is preferable that the ratio of the thickness of the adhesive layer to the thickness of the masking layer is 1:13 to 1:35.

The pressure-sensitive correction tape of the present invention can be preferably used with a conventional hand-held transfer device. Alternatively, the correction tape can be used without using such a transfer device. For example, the correction tape is overlaid on a portion of a surface to be masked with the pressure-sensitive adhesive layer of the correction tape brought in contact with that portion, and a pressure is applied onto the correction tape by means of an appropriate pressing device such as a spatula to transfer the masking layer together with the adhesive layer onto the surface for masking-correction.

The present invention will be more fully described by way of Examples and Comparative examples thereof. It is to be understood that the present invention is not limited to these Examples, and various changes and modifications may be made in the invention without departing from the spirit and scope thereof. In the following, the term "parts" refers to parts by weight.

EXAMPLE 1

The coating liquid A for masking layer with the following formula was applied on one side of a glassine paper sheet having a basis weight of 40 g/m$^2$ treated with a releasing agent on both sides thereof and dried to form a masking layer having a thickness of 25 $\mu$m. Onto the thus formed masking layer was applied a coating liquid B for an adhesive layer with the following formula and dried to form an adhesive layer having a thickness of 1.2 $\mu$m, yielding a stock web for pressure-sensitive correction tape. The adhesive strength of the pressure-sensitive adhesive layer determined by the measurement method previously mentioned was 20 g/25 mm.

| Coating liquid A for masking layer | |
|---|---|
| Component | Parts |
| Styrene polymer(SEBS, Kraton G1657X made by Shell Corp.) | 6 |
| Hydrocarbon resin(MARUKAREZ H940C made by Maruzen Petrochemical Company, Limited) | 5 |
| Titanium Oxide | 27 |
| Dispersing agent | 2 |
| Acetyl tributyl citrate | 3 |
| Toluene | 58 |

| Coating liquid B for adhesive layer | |
|---|---|
| Component | Parts |
| Acrylic resin type adhesive agent (1) | 30 |
| Water | 30 |
| Isopropyl alcohol | 40 |

EXAMPLE 2

The same procedures as in Example 1 were repeated to give a stock web for pressure-sensitive correction tape except that the following coating liquid C was used as the coating liquid for the adhesive layer.

| Coating liquid C for adhesive layer | |
|---|---|
| Component | Parts |
| Acrylic resin type adhesive agent (2) | 50 |
| Water | 50 |

Comparative Example 1

The same procedures as in Example 1 were repeated to give a stock web for pressure-sensitive correction tape except that the coating a mineral oil was used instead of acetyl tributyl citrate in the coating liquid A was used as the coating liquid for the masking layer.

Comparative Example 2

The same procedures as in Example 1 were repeated to give a stock web for pressure-sensitive correction tape except that the aforesaid coating liquid D was used instead of the coating liquid A as the coating liquid for the masking layer and the coating liquid E of the following formula was used instead of the coating liquid B as the coating liquid for the adhesive layer.

| Coating liquid E for adhesive layer | |
|---|---|
| Component | Parts |
| Acrylic resin type adhesive agent (3) | 50 |
| Water | 50 |

Comparative Example 3

The same procedures as in Example 1 were repeated to give a stock web for pressure-sensitive correction tape except that the aforesaid coating liquid D was used instead of the coating liquid A as the coating liquid for the masking layer and the coating liquid F of the following formula was used instead of the coating liquid B as the coating liquid for the adhesive layer.

| Coating liquid F for adhesive layer | |
|---|---|
| Component | Parts |
| Acrylic resin type adhesive agent (4) | 50 |
| Water | 50 |

Each of the thus obtained stock webs for pressure-sensitive correction tape was slit into 6 mm-wide tapes and, at the same time, each tape having a length of 10 m was wound around a core. Thus, a roll of the pressure-sensitive correction tape wound was obtained. Each roll of the correction tape was installed in a commercially available hand-held transfer device and used for evaluation of transferability and removability in the following evaluation methods. The results are shown in Table 1.

(1) Transferability

A whole-length feeding test was performed on a PPC sheet using the transfer device to evaluate whether transfer failure occurred. The evaluation was based on the following criteria:

Point 5: No transfer failure occurs.
Point 3: Transfer failure occurs.
Point 1: The masking layer is not entirely transferred.

(2) Removability

The masking layer together with the adhesive layer was transferred onto a PPC sheet by use of the above-mentioned transfer device. A plastic eraser was reciprocated up and down on the transferred masking layer to remove it by rubbing. The removability was evaluated on the basis of the following criteria. In the following, one removing operation refers to one up-and-down movement.

Point 5: The mashing layer can be removed by conducting the removing operation less than five times.
Point 4: The masking layer can be removed by conducting the removing operation not less than 5 times to less than 10 times.
Point 3: The masking layer can be removed by conducting the removing operation not less than 10 times to less than 20 times.
Point 2: The masking layer can be removed by conducting the removing operation not less than 20 times to less than 30 times.
Point 1: The masking layer cannot be removed by conducting the removing operation not less than 30 times.

TABLE 1

|  | Example | | Comparative Example | | |
|---|---|---|---|---|---|
|  | 1 | 2 | 1 | 2 | 3 |
| Coating liquid for masking layer | A | A | D | D | D |
| Coating liquid for adhesive layer | B | C | B | E | F |
| Thickness of making layer (μm) | 25 | 25 | 25 | 25 | 25 |
| Thickness of adhesive layer (μm) | 1.2 | 1.2 | 1.2 | 1.2 | 1.2 |
| Adhesive strength (g/25 mm) | 20 | 60 | 20 | 90 | 5 |
| Evaluation |  |  |  |  |  |
| Transferability | 5 | 5 | 5 | 5 | 1 |
| Removability | 5 | 5 | 2 | 1 | * |

*Failure to evaluate due to no transfer of masking layer

In addition to the materials and ingredients used in the Examples, other materials and ingredients can be used in the present invention as set forth in the specification to obtain substantially the same results.

When the pressure-sensitive correction tape of the present invention is used for the masking correction, it is easy to remove an erroneously transferred masking layer by means of an eraser or the like.

What is claimed is:

1. A pressure-sensitive correction tape comprising a foundation, a masking layer and a pressure-sensitive adhesive layer stacked on the foundation in this order, the masking layer comprising a masking agent, a polymer having rubber elasticity and an ester compound which is liquid at ordinary temperature and has a boiling point of not less than 130° C. at ordinary pressure.

2. The pressure-sensitive correction tape of claim 1, wherein the polymer having rubber elasticity comprises a styrene polymer and the ester compound being liquid at ordinary temperature comprises at least one member selected from the group consisting of di(2-ethylhexyl) adipate, di(2-ethylhexyl) sebacate, di(2-ethylhexyl) azelate, fatty acid triglyceride, trimethylolpropane trioctanoate, butyl benzyl phthalate, diisodecyl phthalate, trioctyl phosphate, tributyl phosphate, tri(butoxyethyl) phosphate, acetyl tributyl citrate and acetyl triethyl citrate.

3. The pressure-sensitive correction tape of claim 1, wherein a coating agent for the pressure-sensitive adhesive ray shows an adhesive strength of 10 to 70 g/25 mm according to the 180° peel method specified in JIS Z 0237.

4. The pressure-sensitive correction tape of claim 2, wherein a coating agent for the pressure-sensitive adhesive layer shows an adhesive strength of 10 to 70 g/25 mm according to the 180° peel method specified in JIS Z 0237.

* * * * *